PATENTED JUN 22 1971
3,586,273
INVENTOR
JEROME J. SLOYAN
Howard P. King
BY
ATTORNEY
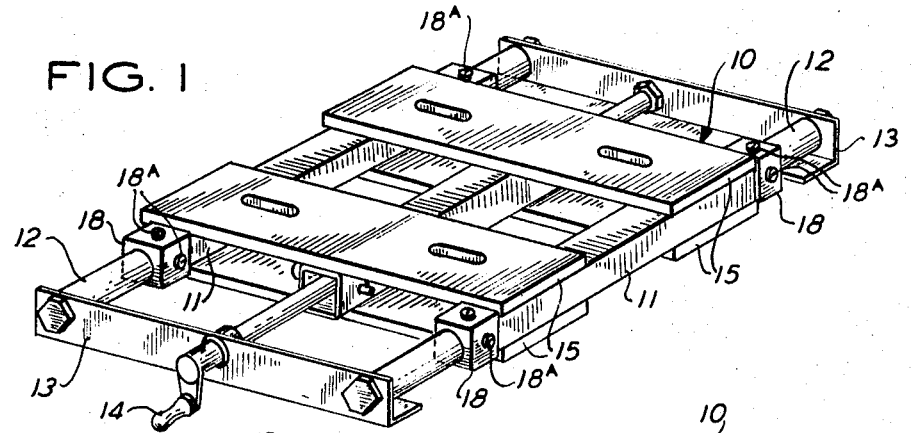
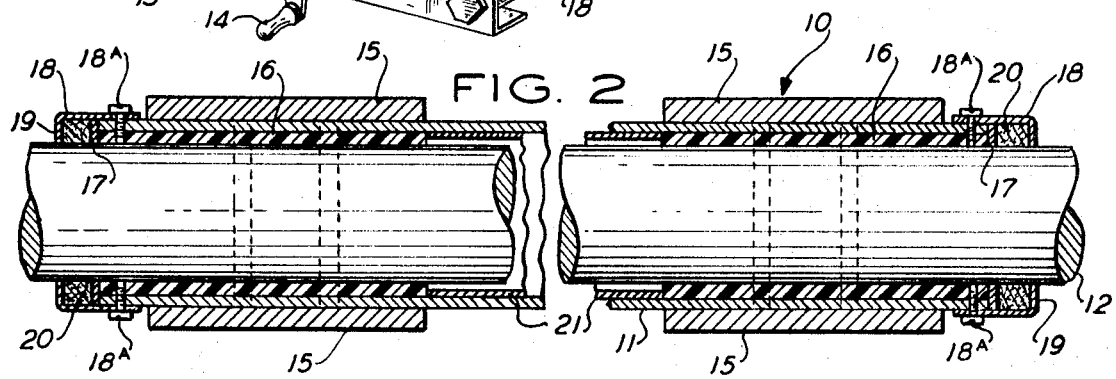
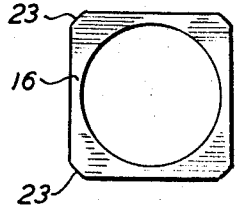
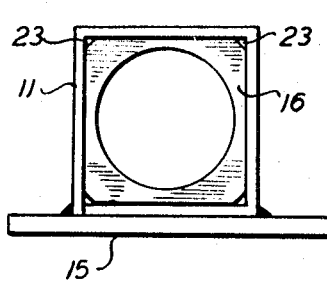
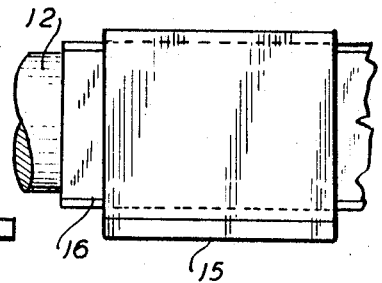
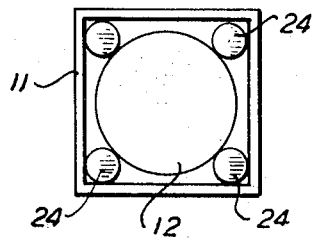
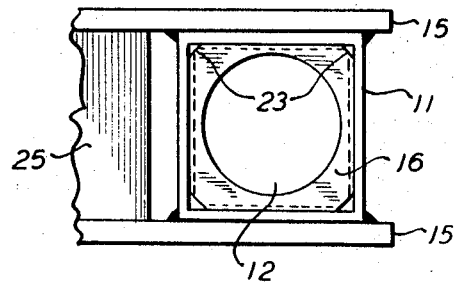

United States Patent

[11] 3,586,273

| [72] | Inventor | Jerome J. Sloyan<br>c/o Automatic Motor Base Co.,<br>Windsor, N.J. 08561 |
|---|---|---|
| [21] | Appl. No. | 802,115 |
| [22] | Filed | Feb. 25, 1969 |
| [45] | Patented | June 22, 1971 |

[54] MOTOR BASE WITH NONLUBRICATED SLIDING CARRIAGE
4 Claims, 7 Drawing Figs.

[52] U.S. Cl. .................................................. 248/23,
74/242.12, 308/3
[51] Int. Cl. ........................................................ F16m 3/00
[50] Field of Search ........................................... 248/13, 16,
23, 298, 287; 308/3; 74/242.15, 242.12, 242.13,
242.14

[56] References Cited
UNITED STATES PATENTS

| 2,762,662 | 9/1956 | Sloyan | 248/23 X |
| 2,833,597 | 5/1958 | Sloyan | 248/23 X |
| 2,833,598 | 5/1958 | Sloyan | 248/23 X |
| 3,011,219 | 12/1961 | Williams | 308/DIG. 7 |
| 3,218,098 | 11/1965 | Rowlett | 308/DIG. 7 |

FOREIGN PATENTS

| 1,277,484 | 1/1961 | France | 308/DIG. 7 |
| 1,277,485 | 1/1961 | France | 308/DIG. 7 |
| 926,718 | 5/1963 | Great Britain | 308/DIG. 7 |

Primary Examiner—Roy D. Frazier
Assistant Examiner—J. Franklin Foss
Attorney—Howard P. King ABSTRACT: At least two square housing tubes on respective round rails with intervening thermoplastic gliders at opposite end regions of the tubes, each glider being a form-fit with its respective square tube and round rail, rendering the gliders nonchattering on the rails, and nonrotatable in the tubes and longitudinally slidable on the rails with a minimum of friction without lubrication, and the assembly of each tube and its rail having means for retaining the gliders in their appointed longitudinal locations within their respective tube.

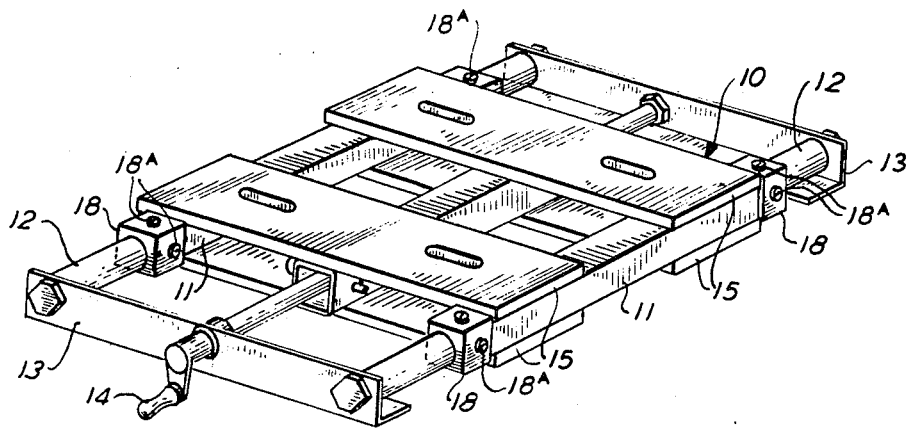

MOTOR BASE WITH NONLUBRICATED SLIDING CARRIAGE

GENERAL CONSIDERATIONS

When a motor is equipped with a spring-loaded variable-pitch pulley, and the driven pulley on the responding machine is of fixed diameter, changes in the speed of the driven pulley are affected by changes in the center distances between the pulleys. An increase in the center distance results in a decrease in the speed of the driven pulley, second, a decrease in center distance produces an increase in speed. To effect these changes, the motor is usually mounted on a movable carriage supported on a pair of parallel rails. In many applications it is desirable to effect a rapid change in speed, and if the motor carriage is to moved manually, as in most instances, it is essential that it be accomplished with a minimum amount of effort. Various expedients have been employed in attempts to reduce friction resistive to the sliding of the carriage on its rails, such as inclusion of lubricant, utilization of line contacts as well as provision of ball bearings. Although the application of a proper type of lubricant will aid in reducing the coefficient of friction between rails and carriage, it has its inadequacy in various respects such as pressure extrusion, renewal requirements, space tolerance, but more seriously its dust and grit collecting propensity. Furthermore, lubricants are not permitted in conjunction with food processing for fear of possible contamination of the product. On the other hand it may be pointed out that line contacts develop considerably more friction than ball bearings, ball bearings and to some extent line contacts, develop grooves in the rails thereby not only losing efficiency but augmenting tendency to chatter. So it is, that until now, the problem of providing an adequate, acceptable and constant low coefficient of friction support assuring ready sliding of a motor carriage on its rails has evaded any practical solution.

Fundamentally, the present invention resides in the discovery and utilization of a material capable of slippage on the steel rails without benefit of extraneous lubricant comparative to ease of movement of lubricated steel on steel. In this connection, it should be remembered that tables of coefficients of friction are divided into categories of "static" and "sliding." Each of these categories are subdivided as either "dry" or "lubricated." The static category represents a force ratio to initiate movement between two bodies and for steel to steel is considerably greater than for the bodies in sliding operation. But for the structure under consideration herein, the movement of the carriage on the rails has to be initiated so that the static friction has to be overcome and therefore assume importance in establishing a criterion for ease of operation. Published tables of coefficients of friction show figures for dry steel to steel are 0.74 which reduces to 0.57 when sliding, and when both sliding and lubricated becomes 0.09. Thus, as a criterion for ease of sliding a coefficient of friction of 0.1 may be assumed.

THE BASIC CONCEPT

I have found that, with respect to steel rails employed in motor bases, a coefficient of friction substantially within the above-stated criterion of 0.1 for static operation and as low as 0.04 may be attained with a cooperative surface of nonmetallic material, such as hard thermoplastics essentially compound as organic polymers, specific examples which are: 1. ultra high molecular polyethylene, 2. acetal resin, 3. a fluorocarbon polymer known chemically as polytetrafluoroethylene, and 4. a combination of the two latter mentioned. These products, in addition to having very low coefficient of friction, and very especially with respect to the fourth one listed, exhibit other desirable attributes, such as high mechanical strength and rigidity in a large spread of temperatures from below freezing to above boiling of water, great endurance, dimensional stability, and unaffected by moisture, gasoline, solvents and chemical attack. Of most interest are the self-lubricating characteristic or nonrequirement for extraneous lubricant and yet having a very low coefficient of friction down to 0.04 in some instances and at least as favorable as that of lubricated steel. In addition to the beneficial results attained by the above-identified materials, the invention also includes specific structural features for utilization of gliders of such composition.

THE DRAWINGS

FIG. 1 is a perspective view of a motor base for support of a motor on a movable carriage slidable on round rails, embodying the present invention;

FIG. 2 is a sectional view of the carriage taken longitudinally of one of the rails on a vertical diametric plane thereof;

FIG. 3 is an end view of a glider means;

FIG. 4 is a corresponding end view of the glider means located within a square tube housing welded to a basal plate;

FIG. 5 is a side elevation of the assembly of FIG. 4;

FIG. 6 is an elevation of the assembly of rail and housing looking toward one end of FIG. 2; and FIG. 7 is an end view showing one of the housings with a mandrel therein. Mandrels are used to accurately position the housings during the fabricating operation.

DETAILED DESCRIPTION

In accordance with prior art construction, the present motor support also comprises a movable carriage 10 constituted by a plurality of cross-sectional square housing tubes 11 through which longitudinally extend cylindrical rodlike rails 12. The rails are fixed at their ends in suitable headers 13 that can be secured on a bench, floor, ceiling, wall or elsewhere. The carriage 10 is slideable on said rails in what may be termed forwardly and rearwardly directions by suitable or prior art means conventionally indicated by crank 14 and screw mechanism (not shown) associated therewith, details whereof appear in prior U.S. patents issued to me. It is the ease of sliding with which the present invention is more particularly concerned. A plurality of transverse plates 15 are welded to and join said housing tubes near their ends and constitute means for support and attachment of a motor to the carriage.

Within the housing tubes near the ends thereof are situated gliders 16 which have a very low coefficient of friction above described generically identified as thermoplastic. Said gliders are cylindrically hollow and are a sliding fit over their respective rails 12 without benefit of an extraneous lubricant. The radially outward contour of gliders 16 substantially conforms to the interior size and shape of housing tubes 11, and into which said gliders are applied as shrink or press fits. Since the shape of the gliders and tubes are square the gliders will be prevented from rotating.

It will be observed that there is a glider proximate to each end of each housing tube. At each end of each housing tube 11 engaging against the end thereof is a plate or flat cap 17 with a central hole for free passage of the rail therethrough. This plate or cap at its inward face constitutes a buttress for engagement by the proximate end of the glider and thereby retains said glider from longitudinally outward displacement. Lapping over each end of each housing tube is a ferrule 18 held in place by a screw 18A passing into an adjacent wall of the housing tube where overlapped. The cap has an outer end wall or flange 19 with a central hold for free passage of the rail therethrough. Interposed between the said end wall or flange 19 and the plate or cap 17, within the ferrule 18 and around the rail 12 is suitable filler 20 of a character both to retain the cap plate in its appointed position and to filter out dust and other contamination from the exterior.

The hollow through the glider is reamed to establish a smooth bore of very exact size to receive the rail 12 with a sliding fit throughout the entire length of the hollow of the glider. This obtains a maximum of surface support capable of supporting heavy loads as well as forestalling chattering, but at the same time, by virtue of the very low coefficient of friction and the self-lubricating characteristic of the above described thermoplastic material constituting the gliders, sliding of the carriage on the rails is accomplished with exceedingly great ease, both from static and during sliding conditions. It may also be pointed out that the movement of the gliders on the rails is entirely longitudinal without any rotary motion and at speeds not in the least conducive to production of heat and therefore no tendency to alter the sliding fit of the gliders on the rails.

Between the pair of gliders on each rail there is a spacer sleeve 21 of appropriate length to brace both gliders against their respective end plates, thus cooperating to maintain the gliders in fixed relation to the respective housing tube in which situated. Said sleeve 21 has appropriate telescopic engagement within the housing tubes and adequate looseness with respect to the rail to avoid introduction of friction therewith.

In performing the assembly operation, it will be found to be advantageous to employ welding as a practical means of fabrication of the carriage, but utilizing a method avoiding the possibility of injury from heat in too close an approach to the gliders. A satisfactory procedure is to use two temporary rails or mandrels having diameters equal to that of the inside of the housing tubes, and insert them through the housing tubes 11 with both ends projecting therefrom. These temporary rails have a greater diameter than the ultimate rails 12 so as to compensate for the omission of the gliders and yet, by engagement with all four walls of the housing tube, retain the housing tube symmetrically located with respect to the axis of the rail. If the number of bases to be made does not warrant provision of a specially prepared temporary rail of mandrels, the ultimate rail 12 can be used at this stage in a temporary capacity by equally chocking the interior corners of the housing tubes with rods or pins 24 as shown in FIG. 7. The projecting ends of the temporarily employed rails are then temporarily secured to a pair of parallel headers arranged to locate the temporary rails in parallelism to each other and at precisely the axial spacing which is to exist in the ultimate relation of the permanent rails 12 when assembled in the housing tubes. While for quantity production it is preferred to utilize a previously prepared jig, the final headers 13 may be initially thus used as a temporary assembly adjunct. Next, the crossmembers or basal plates 15 are laid across and temporarily clamped in appointed position on the housing tubes and then welded thereto, following which, the clamps are removed, the temporary rails or mandrels are released from the temporary retention by the headers and withdrawn from the housing tubes. Thereafter the gliders and spacing sleeves can be inserted in the housing tubes free of all danger of injury by welding heat. The ultimate rails are inserted through the housing tubes and gliders are secured in ultimate position to their headers 13. By virtue of the foregoing mode of assembly, the respective rails and their gliders will be coaxial and the rails in exact parallelism so the carriage will slide easily with maximum surface support from the rails.

I claim:

1. A motor base comprising a plurality of cylindrical rails arranged in parallel, headers at the ends of said rails transverse thereto and with said rails secured thereto, a slidable carriage mounted on said rails with the mounting thereof including a plurality cross-sectionally square longitudinal tubes encompassing said rails with each tube providing four contiguously successive inwardly directed flat faces, lateral members interconnecting said tubes and rigidly holding the same at distances apart corresponding to the distances between centers of said rails, gliders in said tubes, each of said gliders having an external peripheral surface square in transverse section and of dimension corresponding to the cross-sectional interior dimension of the encompassing tube and providing four external faces having press fit against the several internal faces of the respective tube, thereby retaining the glider nonrotatably in the tube, and each glider having a longitudinal cylindrical hollow the inner surface whereof has sliding fit on its respective rail.

2. A motor base in accordance with claim 1, wherein said external faces of the glider are substantially in their entireties in flatwise engagement with the interior face of the tube in which located.

3. A motor base in accordance with claim 1, wherein each said glider is solid throughout its entirety between said exterior peripheral surface thereof and its interior cylindrical surface.

4. A motor base in accordance with claim 3, wherein said glider in its entirety is composed of thermoplastic only.